(No Model.)  P. F. HODGES.  2 Sheets—Sheet 1.
GRAIN BINDER.
No. 344,964.  Patented July 6, 1886.
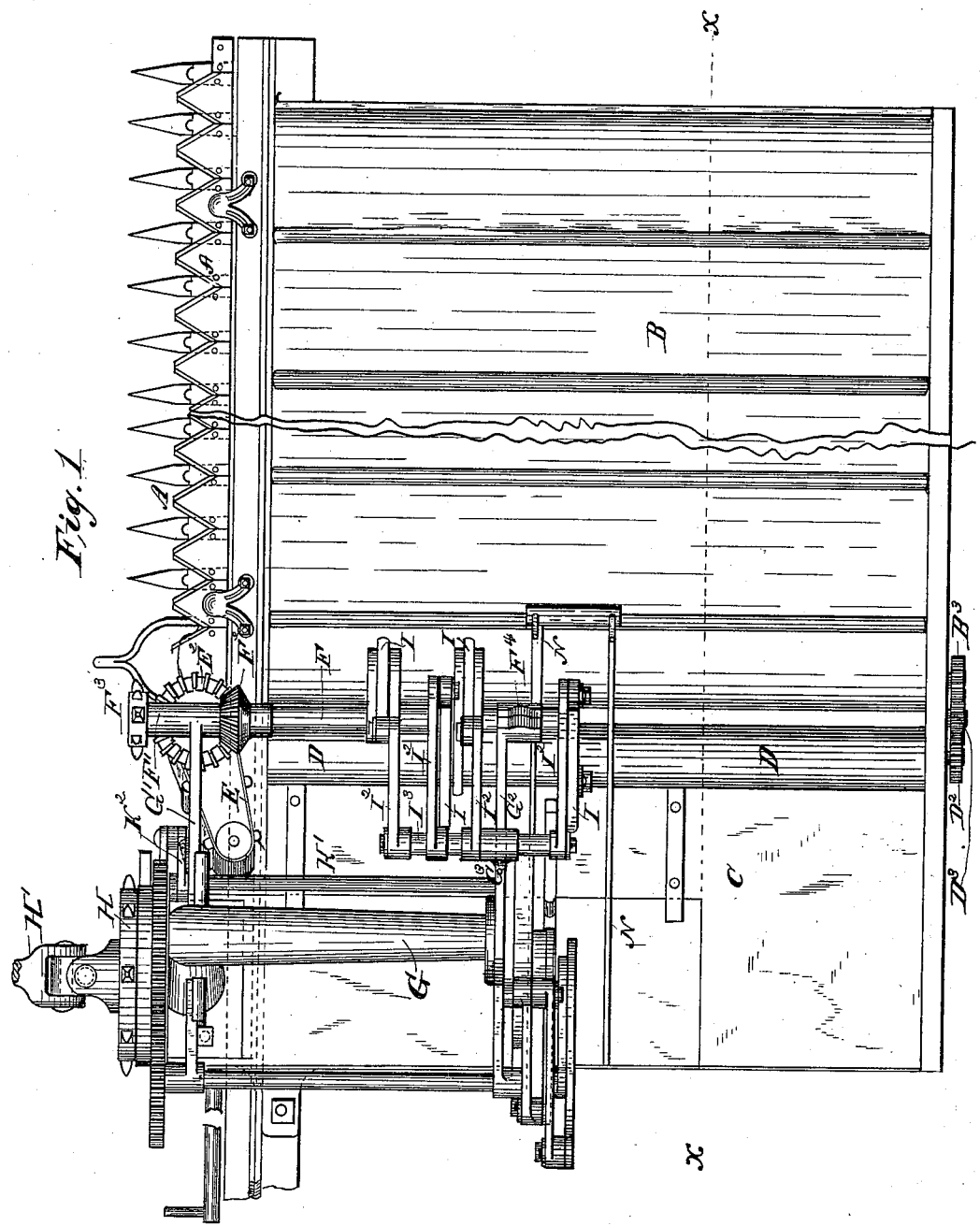
Witnesses:
E. N. Walker
W. M. Hannay
Inventor:
Philip F. Hodges
by his attorney (No Model.) 2 Sheets—Sheet 2.
P. F. HODGES.
GRAIN BINDER.
No. 344,964. Patented July 6, 1886.
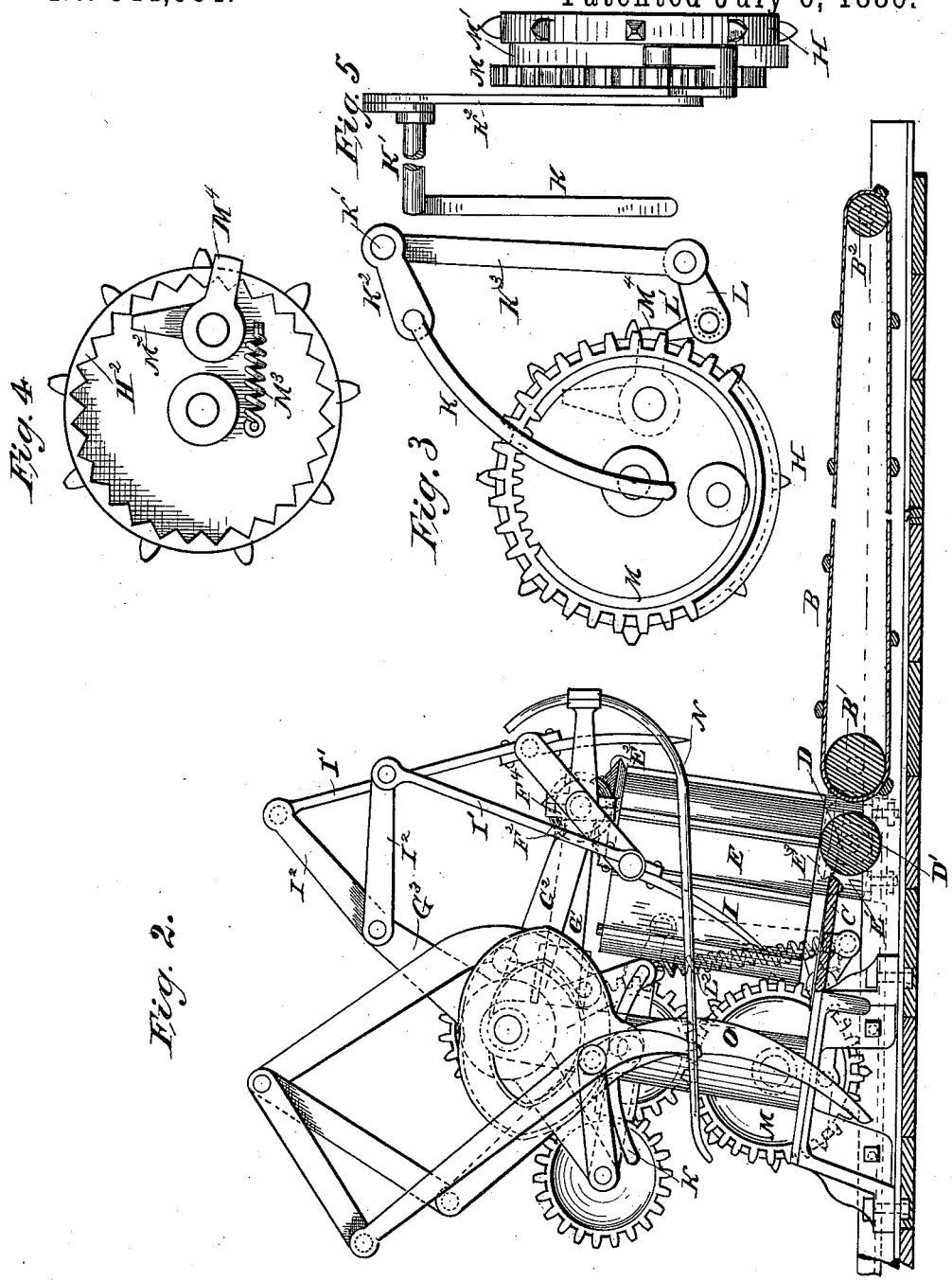

UNITED STATES PATENT OFFICE.

PLINY F. HODGES, OF MINNEAPOLIS, MINNESOTA.

GRAIN-BINDER.

SPECIFICATION forming part of Letters Patent No. 344,964, dated July 6, 1886.

Application filed April 9, 1884. Serial No. 127,217. (No model.)

*To all whom it may concern:*

Be it known that I, PLINY F. HODGES, a citizen of the United States, residing at Minneapolis, in the county of Hennepin and State of Minnesota, have invented certain new and useful Improvements in Grain-Binders; and I do hereby declare the following to be a full, clear, and exact description of the invention, such as will enable others skilled in the art to which it appertains to make and use the same.

This invention relates to self-binding harvesting-machines in which the grain cut by the sickle falls upon an endless apron, by which it is delivered sidewise to a low-down binder.

My improvement consists of certain novel combinations, which are specifically pointed out in the claims at the close of this specification.

In order that my invention may be clearly understood, I have illustrated in the annexed drawings, and will proceed to describe, so much of a self-binding harvesting-machine embodying my invention as will suffice to exemplify the application thereof in a practical form.

Figure 1 is a plan of such portion of a self-binding harvesting-machine. Fig. 2 is a transverse section thereof in the plane indicated by the broken line $x\,x$ of Fig. 1. Figs. 3 to 5 illustrate details thereof.

The same letters of reference indicate identical parts in all the figures.

The grain cut by the cutter-bar A is received upon the platform-carrier B, which is an endless slatted canvas stretched on rollers B' and B², one of which is so driven, in manner presently to be described, that the upper side of the canvas is constantly traveling toward the low-down binder-table C. A driven roller, D, is interposed between the low-down binder-table and the platform-carrier to strip or clear the grain from the latter and aid in transferring it to the former. The butts of the grain delivered by the platform-carrier are acted upon by a butter, which consists, in this instance, of the well-known endless slatted butting-canvas E, stretched on upright rollers, and so constructed and arranged that it can be swung on the axis of its driven roller, for adjusting it, to cause its canvas to run at a greater or lesser obliquity with reference to the line of the cutting apparatus, and thus push the grain back more or less, according to its length, to so dispose it with reference to the binding cord or wire that the gavels may be tied at the proper distance from the butts. The butter is located a little in advance of the front end of the clearing-roller D, and its swinging end reaches some distance over the binder-table. The driven roller of the butting-canvas is journaled at its lower end in a step-bearing, E, secured to the finger-beam, while its upper end is journaled in the lower side of the bearing F' of the packer-shaft F. The upper journal of the driven roller of the butting-canvas carries a bevel-wheel, E², which is driven by a bevel-wheel, F², on the packer-shaft, and its lower journal carries a bevel-wheel, E³, which drives a bevel-wheel, D', fixed to the front journal of the clearing-roller. The rear journal of the clearing-roller carries a spur-wheel, D², which drives a spur-wheel, B³, on the roller B' of the platform-carrier through the intermediate spur-wheel D³. The packer-shaft F is supported in bearings F' and F⁴ at the outer ends of arms G' and G², projecting from the binder-frame G. The front end of the packer-shaft is provided with a chain-wheel, F³, which is driven by a chain (not shown) from the chain-wheel H, from which latter all the moving parts of the binder derive their motion, and which is driven by a tumbling-rod, H'. Four packers, I, are shown, each pivoted to a separate crank of the packer-shaft, and provided with an upwardly-projecting tail, I', the upper end of which is connected by a link, I², to a shaft, I³, supported on an arm, G³, on the binder-frame. A pair of compressing-fingers, N, secured to a bracket-arm on bearing F⁴, overhang the binder-table. The packers pack the grain under these compressing-fingers against the binding cord or wire and against the trip-arm K beyond. This arm K is secured to the rear end of a shaft, K', the front end of which is provided with a crank-arm, K², which is connected by a rod, K³, to the arm L of an elbow-lever, the other arm, L', of which projects upward and stands in close proximity to the chain-wheel H. A spring, L², fastened at one end to the binder-frame and at the other end to the arm L of the elbow-lever, tends to hold the parts normally in the position shown in Fig. 3, so that the arm K stands across the grain-passage of the binder, reaching with its lower end close down to the binder-table, while the arm L' of the elbow-lever bears against the rim M' of the spur-wheel M, which is the first wheel of the train for operating the binding-arm and parts connected therewith. This wheel M is loose on the shaft of the chain-wheel H, and carries a pivoted pawl, M², on the side facing the chain-wheel, the confronting side of which has a ring of internal ratchet-teeth, H², adapted to engage pawl M², and through it drive wheel M. A spring, M³, constantly tends to throw pawl M² in gear with ratchet-teeth H². Pawl M² is constructed with an arm, M⁴, which projects through a slot in the rim M' of wheel M, so as to strike upon the end of arm L' of the elbow-lever, when the latter is in the position shown in Fig. 3, and turn the pawl M², disconnecting it from the ratchet-teeth H². The tension of spring L² determines the size and compactness of the gavel packed by the packers against the trip-arm K. When a gavel of desired size and compactness has been accumulated, the trip-arm yields, turning shaft K', so as to cause the arm L' of the elbow-lever to be turned from under the arm M⁴ of the pawl M², which is at once thrown in gear by its spring M³ with the ratchet-teeth of chain-wheel H, which then puts the binding mechanism in motion to encompass and tie the gavel with a binding cord or wire and to discharge the bundle. The trip-arm K and binding-arm O are shown in the position they occupy at the time when the cord is knotted or the wire twisted. The bundle is discharged from under the trip-arm, which is then immediately turned down again by the recoil of spring L².

The mechanism for automatically throwing the wheel M in gear and out of gear is termed the "automatic trip."

The parts of the binding mechanism illustrated, being well known to persons skilled in the art, require no detailed description. From the foregoing the application of my invention to such a binding mechanism can be readily understood, and its application to other approved forms of binding mechanism is readily effected by competent mechanics.

I claim as my invention—

1. The combination, substantially as before set forth, of the platform-carrier, the clearing-roller located at the delivery side thereof, an adjustable butter adapted to adjust the grain to the binder, and packers.

2. The combination, substantially as before set forth, of the platform-carrier, the low-down binder-table, the alternately-thrusting packer for packing the grain into a gavel against the binding cord or wire, and the arm of an automatic trip.

In testimony whereof I affix my signature in presence of two witnesses.

PLINY F. HODGES.

Witnesses:
 C. M. CASTLE,
 HENRY HONKOMP.